United States Patent [19]
Yoshinaka

[11] Patent Number: 4,490,750
[45] Date of Patent: Dec. 25, 1984

[54] APPARATUS FOR REPRODUCING A VIDEO SIGNAL

[75] Inventor: Tadaaki Yoshinaka, Hadano, Japan

[73] Assignee: Sony Corporation, Tokyo, Japan

[21] Appl. No.: 585,638

[22] Filed: Mar. 8, 1984

Related U.S. Application Data

[63] Continuation of Ser. No. 313,158, Oct. 20, 1981, abandoned.

[30] Foreign Application Priority Data

Oct. 20, 1980 [JP] Japan ................................ 55-146513

[51] Int. Cl.³ .......................................... H04N 9/493
[52] U.S. Cl. .................................... 358/320; 358/321; 358/324
[58] Field of Search ......................... 358/320, 321, 324

[56] References Cited
U.S. PATENT DOCUMENTS

| | | | |
|---|---|---|---|
| 3,769,449 | 10/1973 | Inoue | 358/321 |
| 4,123,774 | 10/1978 | Hjortzberg | 358/320 |
| 4,208,671 | 6/1980 | Ozawa et al. | 358/323 |

*Primary Examiner*—Richard Murray
*Attorney, Agent, or Firm*—Lewis H. Eslinger; Alvin Sinderbrand

[57] ABSTRACT

The invention is directed to an apparatus for removing jitter from a recorded color television signal wherein the reproduced chrominance signal is converted to allow frequency chrominance signal and then converted into a high frequency chrominance signal in response to a reference signal containing the same jitter as the subcarrier of the first. The luminance signal is demodulated and mixed with the high frequency chroma signal. The chroma subcarrier, containing the jitter is separated from the mixed signal and used for time base correction as the reference signal.

4 Claims, 2 Drawing Figures

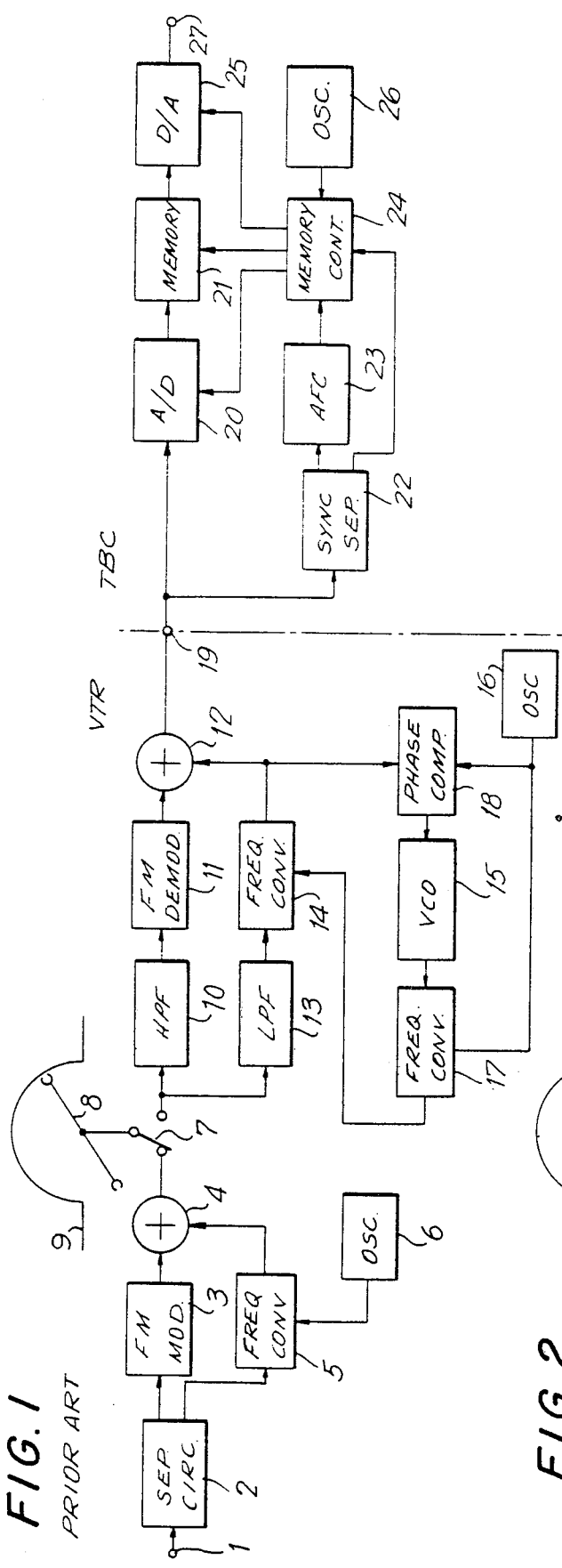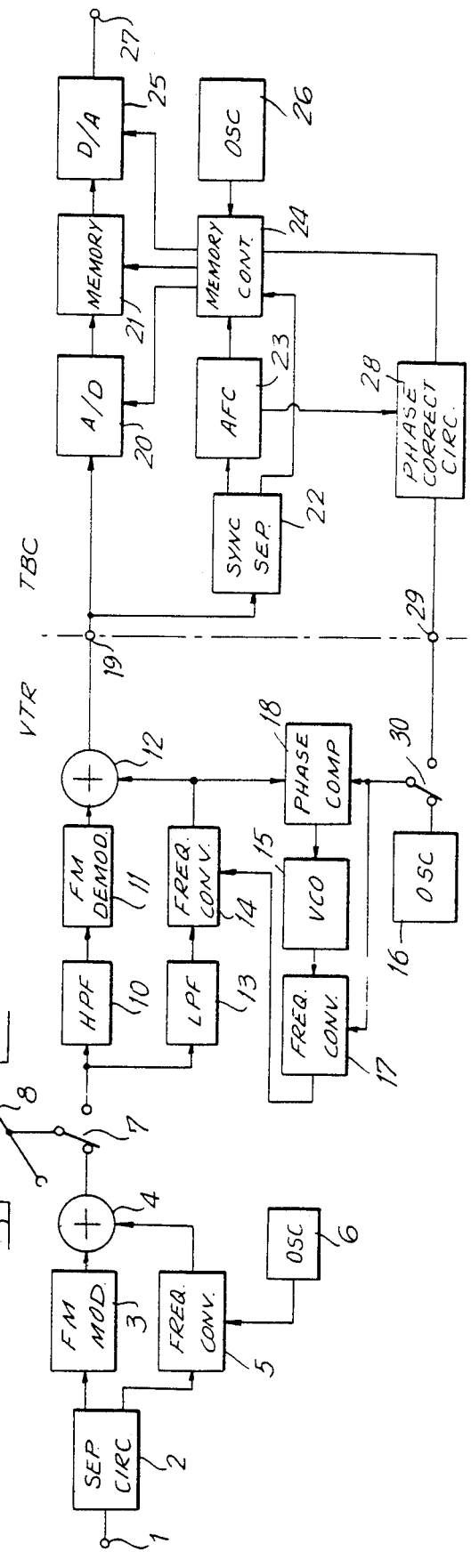

APPARATUS FOR REPRODUCING A VIDEO SIGNAL

This is a continuation of application Ser. No. 06/313,158, filed Oct. 20, 1981, now abandoned.

DETAILED DESCRIPTION OF THE INVENTION

A known VTR (Video Tape Recorder), so-called a U-matic system, is adapted to record and reproduce a video signal as illustrated in FIG. 1. In the figure, the video signal supplied to an input terminal 1 is supplied to a separating circuit 2 provided to separate a luminance signal and a chrominance signal from each other and the luminance signal separated therefrom is supplied through an FM modulator 3 to a mixing circuit 4. The chrominance signal of 3.58 MHz separated by the separating circuit 2 is supplied to a frequency convertor 5 and a converting signal of 4.27 MHz produced from an oscillator 6 is also supplied thereto so as to form a chrominance signal which was converted to a low frequency signal of 688 KHz. This chrominance signal is mixed with the afore-described luminance signal by the mixing circuit 4 and the mixed signal produced therefrom is supplied, via a change-over switch 7, to a rotary head device 8 thereby recorded on a tape 9.

On the other hand, upon reproducing mode, a signal from the rotary head device 8 is supplied through the change-over switch 7 to a high pass filter 10 from which the luminance signal is separated. This luminance signal is supplied through an FM demodulator 11 to a mixing circuit 12. Further, the signal from the change-over switch 7 is supplied to a low pass filter 13 from which the chrominance signal is separated. This chrominance signal is applied to a frequency convertor 14. On the other hand, a signal having the reference frequency 688 KHz from a VCO 15 (Voltage Controlled Oscillator) and a signal of 3.58 MHz from an oscillator 16 are both applied to a frequency convertor 17 thereby to form a signal of 4.27 MHz. This converting signal is applied to the frequency convertor 14 in which the chrominance signal is converted to a high frequency signal of 3.58 MHz. While this chrominance signal is supplied to a phase comparing circuit 18, the signal of 3.58 MHz generated from the oscillator 16 is supplied to the phase comparing circuit 18 and the compared output therefrom is applied to the VCO 15 whereby an APC (Automatic Phase Control) is carried out. Further, the chrominance signal from the convertor 14 is mixed with the aforesaid luminance signal by the mixing circuit 12 and the mixed signal is produced at a terminal 19.

When such reproduced signal as set forth is intended to be approved by a broadcasting standard or the like, a time-base correction is carried out in general in order to remove a jitter and so on from the reproduced signal. To this end, is comprised a time-base correction device as follows.

That is, as shown in FIG. 1, the signal from the terminal 19 is supplied through an AD (Analog-Digital) converting circuit 20 to a memory 21. At the same time, the signal from the terminal 19 is also applied to a synchronizing separating circuit 22 wherein a horizontal and vertical synchronizing signals are separated and the horizontal synchronizing signal thus separated is supplied to an AFC (Automatic Frequency Control) circuit 23 thereby forming a clock signal of, for example, a frequency four times high a chrominance subcarrier containing the jitter and so on equivalent to that of the reproduced signal. This clock signal is supplied to a memory controlling circuit 24. The vertical synchronizing signal from the synchronizing separating circuit 22 is applied to the controlling circuit 24 and a clock signal from this controlling circuit 24 is supplied to the converting circuit 20 and the memory 21. During a predetermined period, the signal from the terminal 19 is memorized in the memory 21.

Further, a signal from the memory 21 is applied to a DA (Digital-Analog) converting circuit 25 and a clock signal of a frequency four times high that of the chrominance subcarrier from a reference oscillator 26 is supplied to the controlling circuit 24. This clock signal is supplied to the memory 21 and the converting circuit 25 whereby a signal read out is produced at an output terminal 27.

However, it the apparatus mentioned above, the chrominance signal in the reproduced signal produced at the termianl 19 has already been phase-controlled by the signal from the oscillator 16 and the jitter thereof was eliminated.

Accordingly, if such signal is supplied to the TBC (Time-base Corrector) in which the horizontal synchronizing signal in the luminance signal is detected and the time-base correction is carried out in order to remove the jitter from the luminance signal, to the chrominance signal is added the jitter of a reverse direction.

Further, when the afore-described VTR performs a variable speed reproduction such as a slow speed reproduction and a multiplied speed reproduction or the like, the same field is repeatedly reproduced or a random field is reproduced so that the reproduced signal is forced to lose a continuity.

In other words, for example, in a video signal of the NTSC system, relative to a first field optionally provided, the signal is deviated by ½ horizontal period in the next second field and in a third field, a phase of the chrominance signal is inverted. In a fourth field, the signal is deviated by ½ horizontal period and at the same time, the phase of the chrominance signal is inverted. These first to fourth fields are adapted to be repeated.

Therefore, in order to carry out a still reproduction, from a single field are formed the afore-described first to fourth fields. Namely, in the first field, the signal is produced as it is and in the second field, the signal is delayed by a ½ horizontal period thereby produced. In the third field, the phase of the chrominance signal in the signal is inverted and reproduced. In the fourth field, the signal which was delayed by the ½ horizontal period and the phase of the chrominance signal of which is inverted is produced.

In this case, each delay of the ½ horizontal period can be performed by the TBC as mentioned above. However, in order to invert the phase of the chrominance signal, the luminance signal and the chrominance signal must again be separated from each other. If such separation is repeated, there is a fear that the signal may be largely deteriorated.

In view of the above defects, this invention is to provide a simple arrangement which can solve these problems.

That is, according to this invention, such an arrangement is provided as follows. The chrominance signal is separated from the reproduced video signal in which the chrominance signal is converted to a low frequency signal and this chrominance signal is converted to a high frequency signal utilizing a predetermined converting signal. The chrominance signal thus high-pass converted is mixed with the reproduced video signal from which the chrominance signal was eliminated. When this mixed signal is time-base corrected so at to be produced, the jitter is detected from this mixed signal and in response to this jitter, the converting signal is corrected thereby permitting the equivalent jitter to be added to the chrominance signal contained in the mixed signal. At the same time, the continuity of the mixed signal is detected and the phase of the converting signal is inverted based on the detected signal therefrom.

BRIEF DESCRIPTION OF THE DRAWINGS

FIG. 1 is a systematic diagram showing a known apparatus and

FIG. 2 is a systematic diagram showing one embodiment of this invention.

Reference numerals 14 and 17 the frequency convertors, 15 the VCO, 18 the phase comparing circuit, 22 the synchronizing separating circuit, 23 the AFC circuit and 28 the phase correcting circuit.

One embodiment of this invention will hereinafter be described with reference to drawings. In FIG. 2, the parts corresponding to those in FIG. 1 are marked with the same references.

As shown in FIG. 2, from the AFC circuit 23 is produced the chrominance subcarrier containing the same jitter as that of the reproduced signal, which is in turn supplied to a phase correcting circuit 28. At the controlling circuit 24 is detected whether the continuity of the chrominance signal exists or not and the signal to indicate the discontinuity of the chrominance signal is supplied to the correcting circuit 28. When this signal is supplied, the correcting circuit 28 inverts the phase of the chrominance subcarrier and this chrominance subcarrier is produced at a terminal 29.

In the VTR, in place of the signal from the oscillator 16, the signal from the terminal 29 is supplied through a change-over switch 30 to the convertor 17 and the phase comparing circuit 18.

Therefore, in this apparatus, to the convertor 17 and the comparing circuit 18 of the VTR is applied the chrominance subcarrier having the jitter equivalent to the jitter contained in the reproduced signal and from the convertor 17 is produced the converting signal having the jitter equal to the reproduced signal whereby the high-frequency band conversion is carried out so that the convertor 14 produces the chrominance signal containing the jitter equivalent to the luminance signal.

Further, when the phase of the chrominance signal in the reproduced signal becomes discontinuous, is inverted the phase of the chrominance subcarrier to be supplied to the convertor 17 and the comparing circuit 18 whereby is inverted the phase of the converting signal generated from the convertor 17. By such process, the phase of the chrominance signal which is converted to the high frequency signal is inverted thereby making the phase of the chrominance signal contained in the reproduced signal continuous.

As seen in the above, the reproduced signal from the VTR is delivered through the TBC. According to this invention, since when to perform the high frequency band conversion the converting signal is added with the jitter and the phase inversion of the signal is carried out, if necessary, it is always possible to carry out the satisfactory time-base correction as well as to maintain the continuity of the chrominance signal.

Further, since according to this invention it is not necessary to separate the luminance signal from the chrominance signal, the signal deterioration may not be caused and the arrangement of an apparatus becomes remarkably simple.

With respect to the VTR, there has been presented a VTR in the prior art which has been provided with a terminal corresponding to the terminal 29 of this invention to utilize an external synchronizing or the like. This invention can be easily applied to the VTR of such arrangement and at the same time, can be applied as an apparatus wherein the VTR is integrated with the TBC so as to form an unitary body.

I claim:

1. Apparatus for reproducing a video signal composed of a chrominance signal and a luminance signal, and which may contain jitter, comprising:

means for separating a first chrominance signal and a first luminance signal from the reproduced video signal, said first chrominance signal and said first luminance signal each containing said jitter in their respective subcarriers;

first converting means for connverting said first chrominance signal into a low frequency chrominance signal;

second converting means for converting said low frequency chrominance signal into a high frequency chrominance signal in response to a reference signal containing the same jitter as the subcarrier of said first chrominance signal;

means for demodulating said first luminance signal;

means for mixing the demodulated luminance signal and said high frequency chrominance signal to form a mixed signal;

time base correction means for removing jitter from said mixed signal, including separating means for separating the chrominance subcarrier signal containing said jitter from said mixed signal; and supplying means for supplying said chrominance subcarrier signal to said second converting means as said reference signal.

2. Apparatus according to claim 1, wherein said time base correction means further includes means responsive to said mixed signal for detecting a discontinuity in said high frequency chrominance signal and for generating a discontinuity indicating signal upon the occurrence of said discontinuity, and said supplying means includes phase correction means for correcting a phase of said chrominance subcarrier signal in response to said discontinuity indicating signal prior to supplying said chrominance subcarrier signal to said converting means.

3. Apparatus according to claim 1, wherein said second converting means includes phase comparing means for comparing a phase of said high frequency chrominance signal and of said reference signal supplied by said supplying means, and for producing a compared output in response thereto;

a voltage controlled oscillator for producing a phase control output in response to said compared output from said phase comparing means;

first frequency converter means for producing a converting signal in response to said phase control signal from said voltage controlled oscillator and said reference signal supplied from said supplying means; and second frequency converting means for converting said low frequency chrominance signal into said high frequency chrominance signal in response to said converting signal.

4. Apparatus according to claim 1, wherein said separating means for separating said chrominance subcarrier signal from said mixed signal comprises automatic frequency control circuit means.

* * * * *